United States Patent
Bizaj

(10) Patent No.: US 6,889,946 B2
(45) Date of Patent: May 10, 2005

(54) LEVELING SHOE

(75) Inventor: Roger Bizaj, Berikon (CH)

(73) Assignee: Nivell AG, Bremgarten (CH)

( * ) Notice: Subject to any disclaimer, the term of this patent is extended or adjusted under 35 U.S.C. 154(b) by 0 days.

(21) Appl. No.: 10/148,801

(22) PCT Filed: Dec. 8, 2000

(86) PCT No.: PCT/CH00/00651
§ 371 (c)(1),
(2), (4) Date: Sep. 19, 2002

(87) PCT Pub. No.: WO01/42704
PCT Pub. Date: Jun. 14, 2001

(65) Prior Publication Data
US 2003/0052241 A1 Mar. 20, 2003

(30) Foreign Application Priority Data
Dec. 11, 1999 (CH) .............................................. 2278/99

(51) Int. Cl.$^7$ ............................................. F16M 11/24
(52) U.S. Cl. ................................ 248/188.2; 248/188.4; 248/656
(58) Field of Search .......................... 248/188.2, 188.4, 248/657, 656, 677, 678

(56) References Cited

U.S. PATENT DOCUMENTS

| | | | | |
|---|---|---|---|---|
| 194,582 | A | * 8/1877 | Cole | 248/188.2 |
| 620,481 | A | * 2/1899 | Moody | 248/188.2 |
| 1,794,798 | A | * 3/1931 | Sarr | 248/188.2 |
| 1,987,726 | A | * 1/1935 | Wilkerson et al. | 248/657 |
| 2,034,076 | A | * 3/1936 | Zahner | 299/23 |
| 3,306,562 | A | * 2/1967 | Bellefleur | 248/188.2 |
| 3,325,145 | A | * 6/1967 | Bertuch | 254/104 |
| 3,390,862 | A | * 7/1968 | Schrepfer | 254/104 |
| 4,114,845 | A | * 9/1978 | Weisenberger | 248/615 |
| 4,436,268 | A | * 3/1984 | Schriever | 248/188.3 |
| 4,858,865 | A | * 8/1989 | Schrepfer | 248/188.2 |
| 5,090,924 | A | * 2/1992 | Pfaller et al. | 439/807 |
| 5,427,349 | A | * 6/1995 | Obrecht | 248/657 |
| 5,584,464 | A | * 12/1996 | Whittaker | 248/678 |
| RE35,907 | E | * 9/1998 | Obrecht | 248/657 |
| H002009 | H | * 1/2002 | Martin et al. | 248/677 |

FOREIGN PATENT DOCUMENTS

CH 652 186 10/1985

* cited by examiner

Primary Examiner—Anita King
Assistant Examiner—Amy J. Sterling
(74) Attorney, Agent, or Firm—Wenderoth, Lind & Ponack, L.L.P.

(57) ABSTRACT

A leveling shoe with a base plate (1) that has a base surface (2) and with a support plate (4) for an object that can be adjusted by means of an adjusting wedge device (3) in rectangular height direction relative to the base surface (2). The leveling shoe has an improved stability and is yet simple and inexpensive in its production. The adjusting wedge device (3) includes two wedges (7,10) that can be moved towards or away from each other by actuating a screw spindle (6). The wedges are provided with support surfaces (11,12) for the support of the plate (4). The support surfaces (11,12), in every position of the wedges (7,10), are disposed symmetrically with respect to a first plane ($E_1$) that is perpendicular to the base surface. The screw spindle axis (6) is provided with two screw parts (6a, 6b) that have identical thread pitches but opposite thread directions.

13 Claims, 1 Drawing Sheet

LEVELING SHOE

BACKGROUND OF THE INVENTION

1. Field of the Invention

The invention concerns a levelling shoe.

2. Description of Related Art

A levelling shoe of this type is prior art from, for example, CH-PS 652 186. This levelling shoe also displays a base plate and a supporting plate for an object, for example a machine or a device. The supporting plate can be displaced in a perpendicular direction relative to a base surface of the base plate by means of an adjusting wedge device. The adjusting wedge device comprises an adjusting wedge which in top view is essentially U-shaped, displaying a middle section and two wings which can be displaced by means of a screw spindle transversely to the vertical direction and is at the same time guided with a pair of lower supporting surfaces inclined towards each other on corresponding surfaces of the base plate. The direction of displacement of the adjusting wedge is inclined with respect to the base surface. Both the middle section and the wings are provided with upper supporting surfaces for the supporting plate, while these in turn form a pair of surfaces that are inclined towards each other. When the adjusting wedge is moved in one direction the supporting plate is raised, being impeded by a lateral stop element permanently connected to the base plate from moving transversely and is moved only in a perpendicular direction. When this occurs, especially when raising large loads, enormous lateral forces are exerted on the stop element, which can even cause breakage of the latter. The screw spindle and/or a bearing in which the screw spindle rests are also exposed to a powerful axial stress.

The U-shape of the adjusting wedge is necessary so that there is space on one side for the screw spindle and on the other for a connecting bolt arranged at a right angle to the base surface connecting the object with the base plate. Both the screw spindle and the connecting bolt, however, are located at a distance from a central plane perpendicular to the base surface (i.e. a gravitational plane), which results in an uneven load distribution on the adjusting wedge and an additional moment loading and stress on the screw spindle and/or the bearing, and additionally affects the stability of the levelling shoe.

A further disadvantage lies in the fact that the adjusting wedge displays a relatively complicated form (U-shape, precise seat surfaces and guidance surfaces, etc.). Especially when the levelling shoe is used for large heavy loads, for example, machine tools, which are also exposed to powerful changing loads, so that it is vital for the adjusting wedge to be extremely rigid, and the adjusting wedge must be manufactured precisely from steel, and thus the levelling shoe is expensive to produce.

SUMMARY OF THE INVENTION

This invention is based on the problem of creating a levelling shoe which is simple and cheap to manufacture and displays improved stability.

This problem is solved by a levelling shoe constructed in accordance with the present invention.

Because the adjusting wedge device, in addition to the adjusting wedge, displays a further counterwedge, where both wedges can be moved reciprocally towards or away from each other such that due to the fact that in every position their supporting surfaces for the supporting plate are arranged symmetrically to a plane perpendicular to the base surface, in which plane the axis of the connecting bolt also runs, the enormous, unilaterally-acting forces, as occur in the case of the levelling shoe according to CH-PS 652 186, are eliminated and the load is evenly distributed over both wedges. The screw spindle provided with two threaded parts displaying the same thread pitch, but opposing direction of pitch, arranged perpendicular to the plane of symmetry of the wedges and parallel to the base surface no longer requires an expensive axial bearing, as was previously necessary, since the axial forces transferred onto the two thread parts counteract each other and thus cancel each other out. Although, in place of one adjusting wedge, two wedges are used, the levelling shoe is simpler and cheaper to manufacture than ordinary levelling shoes.

In an especially advantageous fashion, the screw spindle engages with one threaded part in the adjusting wedge and with the other threaded part in a plate arranged on the other side of the adjusting wedge from the counterwedge. The plate is permanently attached to the counterwedge. This attachment is made advantageously via two connecting bolts projecting through the adjusting wedge each surrounded by a spacer sleeve guided so as to slide into the adjusting wedge, which connecting bolts are arranged parallel to the base surface and also serve as guide elements for the wedge. Advantageously the two connecting screws are arranged on both sides and at the same distance from a plane perpendicular to the base surface in which the screw spindle axis runs. As the result of this, a centering sleeve screwed with the base plate can be placed centrally between the two connecting bolts, on which the supporting plate is vertically guided, and which is provided to accept the connecting bolt connecting the object with the base plate. The central arrangement of both the centering sleeve and also the screw spindle considerably increases the stability of the levelling shoe, especially where heavy loads or changing loads are involved. Advantageously both wedges, in the position corresponding to the maximum height adjustment of the supporting plate, come to rest on reciprocal stop faces, so that this end position is clearly defined.

One example of execution of the levelling shoe according to invention is illustrated in the drawing figures and will be described in more detail below.

DETAILED DESCRIPTION OF THE INVENTION

Figure 1:
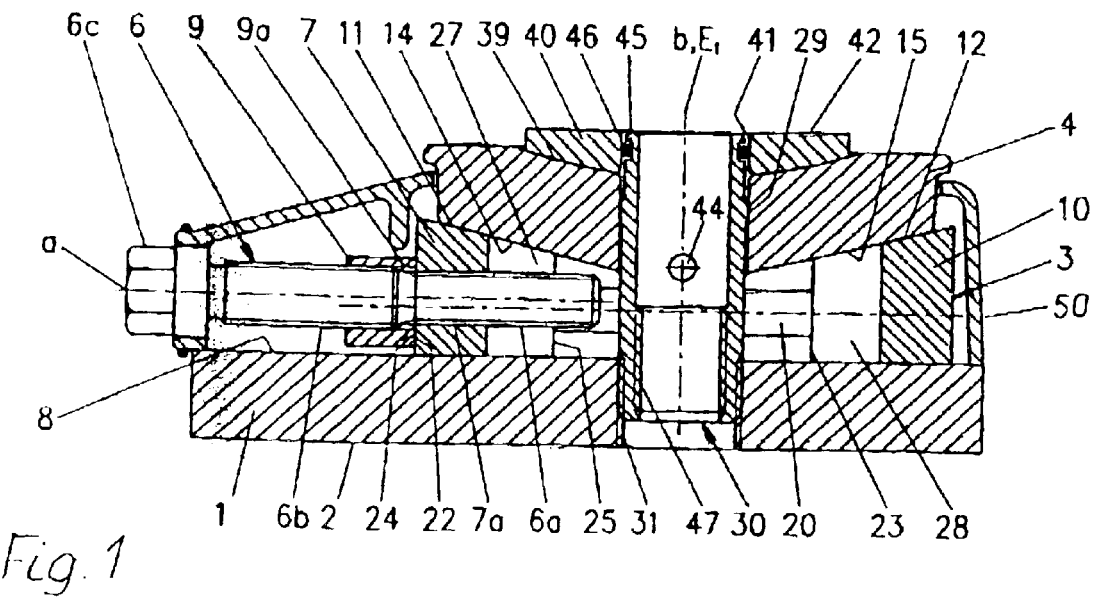
FIG. 1 shows a levelling shoe in longitudinal section.

According to FIG. 1, a levelling shoe displays a base plate 1 with a base surface 2 resting on the floor and also a supporting plate 4 for an object, not shown, for example a machine or a device. The supporting plate 4 is adjustable in height perpendicular to the base surface 2 by means of an adjusting wedge device 3. The adjusting wedge device 3 comprises a screw spindle 6, the axis (a) of which is arranged parallel to the base surface 2 and which displays a first threaded part 6a which engages in a thread bore hole 7a of an adjusting wedge 7 arranged moveably on an upper surface 8 of the base plate 1. The screw spindle 6 is further provided with a second threaded part 6b, which displays the same thread pitch, but an opposing direction of the threads with respect to the first threaded part (left/right thread). The second threaded part 6b engages in a thread bore hole 9a of a plate 9, which—as described below in more detail—is also permanently attached to a counterwedge 10 which is arranged moveably on the upper surface 8 of the base plate 1. Both wedges 7, 10 are provided with a supporting surface 11, 12 at an angle relative to the base surface 2 for the supporting plate 4, which in turn is fitted with corresponding supporting surfaces 14, 15. The supporting surfaces 11, 12 of both wedges 7, 10 which can move by means of the screw spindle reciprocally towards or away from each other are, in every position of the wedge 7, 10, arranged symmetrically with a plane E1 which is perpendicular to the screw axis (a) and to the base surface 2.

Figure 2:
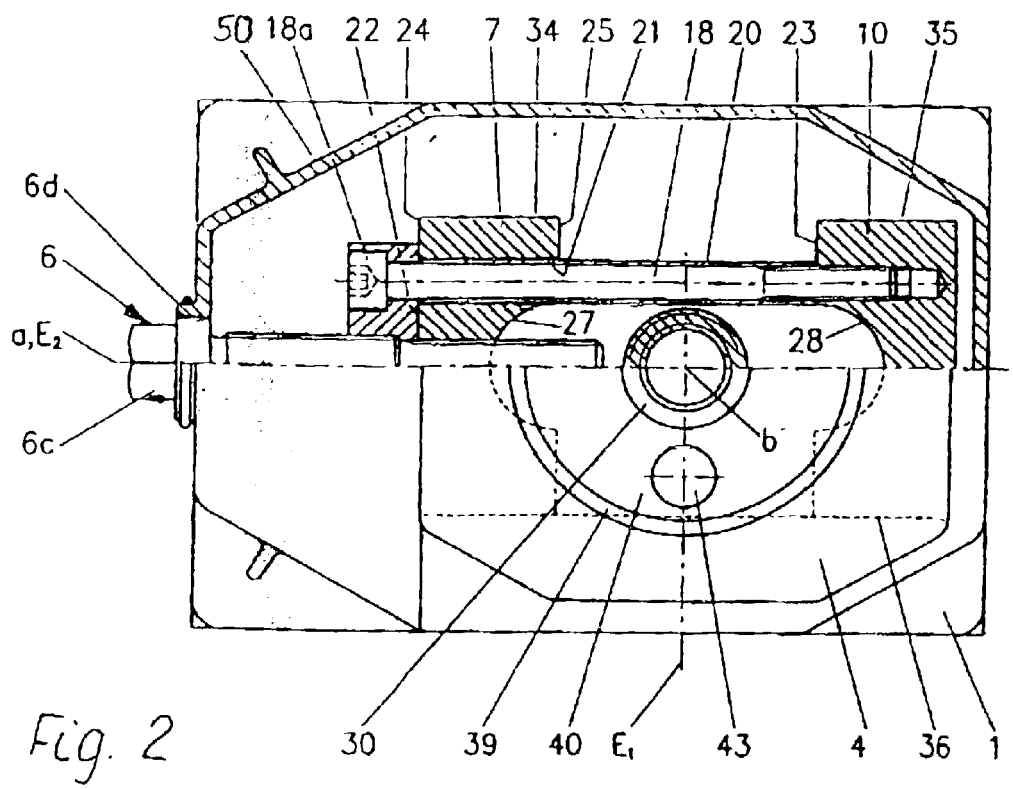
FIG. 2 shows the levelling shoe according to FIG. 1 in top view and partly in sectional view.

The connection of the plate 9 with the counterwedge 10, which is arranged—(as seen in the longitudinal axis of the screw spindle) on the opposite side of the adjusting wedge 7 from the plate 9, is performed by means of the example illustrated in FIG. 2 by means of two connecting bolts 18 projecting through the adjusting wedge 7. The bolts 18 can optionally have their screw head 18a sunk into the plate 9 and screwed into the counterwedge 10. The connecting bolts are positioned parallel and at the same distance from a plane E2 perpendicular to the base surface 2 and to the symmetrical plane E1, in which the spindle axis (a) also lies (only one of the two connecting bolts 18 is visible from the drawing).

One spacer sleeve 20 is assigned to each connecting bolt 18, through which spacer sleeve 20 the connecting bolt projects, and which is guided so as to slide through a bore hole in the adjusting wedge 7. In the axial direction each spacer sleeve 20 is supported on one side on a stop area 22 of the plate 9 and a stop area 23 of the counterwedge 10 on the other side, where both stop areas 22, 23 are placed perpendicular to the base surface 2. In the drawing the position of the two wedges 7, 10 is illustrated in which the stop area 22 of the plate 9 rests on a stop area 24 of the adjusting wedge 7 facing away from the counterwedge 10. In this position the two wedges 7, 10 are at a maximum distance from each other which is defined by the spacer sleeve 20. The adjusting wedge 7 is provided on the side facing the counterwedge 10 with a stop area 25, which corresponds to the stop area 23 of the counterwedge 10. Furthermore each of the two wedges 7, 10 also displays a semi-cylindrical recess 27, 28 facing towards each other.

A centering sleeve 30, positioned perpendicular to the base surface 2, is screwed into a thread bore hole 31 (FIG. 1) of the base plate 1. The supporting plate 4 is provided with a central bore hole 29 which moveably receives the centering sleeve. The centering sleeve 30 determines the arrangement of the supporting plate 4 resting on the wedges 7, 10, and thus too the arrangement of the entire adjusting wedge device 3 on the upper surface 8 of the base plate 1. The axis (b) of the thread bore hole 31 aligned perpendicular to the base surface 2, the centering sleeve 30 and the supporting plate 4 thereby coincides with the intersection lines of both previously described planes E1 and E2. The centering sleeve 30 runs centrally between the two spacer sleeves 20; the position of the adjusting wedge device 3 with respect to the centering sleeve 30 and the supporting plate 4 guided vertically on the centering sleeve 30 in a transverse direction parallel to the base surface 2 and perpendicular to the spindle axis (a) is, for example, defined by side areas 36 of the supporting plate 4 co-operating with the side areas 34, 35 of both wedges 7, 10 (see for example FIG. 2). Both spacer sleeves 20 can, however, also touch the centering sleeve 30 tangentially and thereby define the position of the adjusting wedge device 3 with respect to the centering sleeve 30 transverse to the direction of displacement of the wedges 7, 10.

The supporting plate 4 is provided with an upper, slightly concave, recess 39 on which a disc 40, which is dome-shaped on its under side, rests. The disc 40 displays a bore hole 41 which surrounds the centering sleeve 30 with play and an upper area 42. The area 42 is provided with two indentations 43 positioned symmetrically with respect to the axis of the disc, one of which can be seen from FIG. 2. Both indentations 43 are provided for the insertion of a spacer sleeve (not shown) or a number of spacer sleeves/discs laid one on top of another and protect the latter from lateral slippage.

To screw in the centering sleeve 30 in the bore hole 31 of the base plate 1 the centering sleeve 30 is provided with a fitting hole 44. The sleeve 30 is axially secured by an O-ring 46 which rests in a ring groove 45 of the centering sleeve 30 in the area of the disc bore hole 41. The centering sleeve 30 also displays an inner thread bore hole 47, into which a connecting bolt connecting the object with the base plate 1 (not shown in the illustration) can be screwed.

The levelling shoe is equipped with a covering cap 50 encompassing the supporting plate 4 on its circumference and protecting the adjusting wedge device 3, said cap bestowing an aesthetic external appearance on the levelling shoe. The screw spindle 6 is guided through the covering cap 50 with its guiding collar 6d and projects with its head 6c (which can if appropriate be designed as a hexagonal nut) out of the covering cap 50.

In an initial position, both wedges 7, 10 of the adjusting wedge device 3 are in the position shown in the drawing, which corresponds to the lowest position of the supporting plate 4 resting on the wedges 7,10 due to dead weight. Depending on whether the maximum possible lift of the supporting plate 4 determined by the shape and the means of displacement of the wedges 7, 10 is sufficient, the object to be aligned vertically, for example a machine foot, is placed directly on the area 42 of the disc 40 or one or more spacer discs are laid between this area 42 and the object (slip prevention guaranteed by indentations 43 and corresponding projections of the spacer discs). Then a bore hole provided in the object, e.g. in the machine foot, for the connecting bolt is placed in a position coaxial to the disc bore hole 41 and the connecting bolt is screwed into the centering sleeve 30. The dome-shaped disc 40 resting on the supporting plate 4 serves at this point to compensate for any angular differences between the machine foot and the base surface 2. By rotating the screw spindle 6 the two wedges 7,10 are then moved towards each other and the supporting plate 4 is thereby raised—guided vertically on the centering sleeve 30—together with the load into the desired position. In a position corresponding to the maximum lift of the supporting plate 4, the stop areas 25, 23 come to rest on the wedges 7, 10, where both of the semi-cylindrical recesses 27, 28 together form an opening encompassing the centering sleeve 30. The load is distributed evenly on both wedges 7, 10 and transferred via the latter to the base plate 1. The axial forces transferred to both threaded parts 6a, 6b of the screw spindle 6 via the wedges 7, 10 counteract each other and thus cancel each other out. The result of this is to dispense with the expensive axial bearing for the screw spindle, which is essential in ordinary levelling shoes.

Due to the fact that the spindle axis (a) is positioned in the central plane E2 (i.e. a gravitational plane), in which the axis of the connecting bolt also runs, the screw spindle 6 is not loaded with any additional moments, which would have to be picked up by a bearing. The counterwedge 10 connected to the plate 9 cuts out the precise guidance and/or supporting of the screw spindle necessary with ordinary levelling shoes.

Both wedges 7,10 are guided in their direction of displacement by means of the connecting bolts 18 sheathed by spacer sleeves 20, so that an arrangement of for example precise supporting areas or guidance areas on the wedges inclined in pairs towards each other on the one hand and on the supporting plate on the other hand, such as those on the levelling shoe according to CH-PS 652 186, is not necessary. Wedges 7,10 display a simple external form and can be produced economically. This is important especially when the levelling shoe is used for heavy loads or changing loads, where the wedges 7, 10, must display sufficient rigidity, and which therefore cannot, for example, be produced using the cheap aluminium die-cast process, but have to be made from steel.

The supporting plate 4 resting on the wedges 7,10 due to dead weight is advantageously also secured against improper removal, e.g. on the occasion of transport or assembly, in a way which is not described in more detail (for example by screw bolts connecting the transport plate 4 with the base plate 1, allowing the transport plate 4 to be raised vertically or by a corresponding design of the centering sleeve screwed into the base plate 1).

The design example shown is a levelling shoe which can be screwed up or down with the object and together with the latter forms a free-standing unit with respect to the fundament. The levelling shoe according to invention can, however, also be used for machines which require anchoring to the fundament. In this case the thread bore hole 41 in the centering sleeve is omitted, and an anchor bolt guided through the centering sleeve is anchored in the fundament.

It would also theoretically be possible to have the screw spindle engage directly in the counterwedge with one of the two thread parts displaying the opposite direction of pitch and to screw the object up or down with two connecting bolts placed in plane E1 on both sides of the screw spindle arranged symmetrically to plane E2 with the base plate (1) of with the fundament. The solution according to invention with a centrally-positioned connecting bolt does, however, allow simpler positioning of the object with respect to the base plate (1) and a simple compensation of angular differences between the object and the base surface 2.

What is claimed is:

1. A leveling shoe comprising:

a base plate having a base surface;

a support plate for supporting an object, said support plate being adjustable in a height direction perpendicular to the base surface;

an adjusting wedge device for adjusting the height of said support plate, said adjusting wedge device including an adjusting wedge and a counterwedge, said adjusting wedge resting on said base plate and defining a supporting surface for supporting the support plate, said counterwedge resting on said base plate and defining a supporting surface for supporting the support plate; and a screw spindle for displacing said adjusting wedge and said counterwedge reciprocally towards and away from each other in a direction that is transverse to the elevation, said screw spindle comprising first and second threaded portions displaying the same thread pitch, but opposite thread direction, such that the supporting surfaces of said adjusting wedge and said counterwedge, in every position, are arranged symmetrically with respect to a first plane ($E_1$) that is perpendicular to the base surface, and in which the axis of the connecting bolt runs, and to which the screw spindle axis is positioned at a right angle, wherein said support plate includes an opening through which a connecting bolt can project essentially at a right angle relative to the base surface so that the object can be screwed with the base plate or with a fundament by means of the connecting bolt, and wherein the first threaded portion of said screw spindle engages with in a threaded bore hole in said adjusting wedge and the second threaded portion of said screw spindle engages in a threaded bore hole of a plate, which is arranged on the other side of said adjusting wedge relative to said counterwedge, wherein said plate is permanently fixed to the counterwedge.

2. A leveling shoe according to claim 1, wherein each of said adjusting wedge and said counterwedge has a stop face that is perpendicular to said base plate, and, when said support plate is at a maximum upward adjustment, the stop faces come together.

3. A leveling shoe according to claim 2, wherein the first threaded portion of said screw spindle engages with in a threaded bore hole in said adjusting wedge and the second threaded portion of said screw spindle engages in a threaded bore hole of a plate, which is arranged on the other side of said adjusting wedge relative to said counterwedge, wherein said plate is permanently fixed to the counterwedge, and wherein said plate is connected, by means of two connecting bolts projecting through said adjusting wedge and running parallel to the base surface, to said counterwedge, wherein said connecting bolts are each surrounded by a spacer sleeve guided through said adjusting wedge so as to slide, wherein the spacer sleeves extend between the stop face of said counterwedge and a front or stop face of the plate.

4. A leveling shoe according to claim 2, further comprising two connecting bolts each being encased by a spacer sleeve, wherein said connecting bolts are positioned on either side and at the same distance from a second plane ($E_2$) at right angles to the base surface and to the first plane ($E_1$), in which said screw spindle axis runs.

5. A leveling shoe according to claim 3, wherein, in a position of said adjusting wedge and said counterwedge that corresponds to a lowest position of said supporting plate, a stop face of said plate rests against a stop face of said adjusting wedge facing away from said counterwedge.

6. A leveling shoe comprising:

a base plate having a base surface;

a support plate for supporting an object, said support plate being adjustable in a height direction perpendicular to the base surface;

an adjusting wedge device for adjusting the height of said support plate, said adjusting wedge device including an adjusting wedge and a counterwedge, said adjusting wedge resting on said base plate and defining a supporting surface for supporting the support plate, said counterwedge resting on said base plate and defining a supporting surface for supporting the support plate;

a screw spindle for displacing said adjusting wedge and said counterwedge reciprocally towards and away from each other in a direction that is transverse to the elevation, said screw spindle comprising first and second threaded portions displaying the same thread pitch, but opposite thread direction, such that the supporting surfaces of said adjusting wedge and said counterwedge, in every position, are arranged symmetrically with respect to a first plane ($E_1$) that is perpendicular to the base surface, and in which the axis of the connecting bolt runs, and to which the screw spindle axis is positioned at a right angle, wherein said support plate includes an opening through which a connecting bolt can project essentially at a right angle relative to the base surface so that the object can be screwed with the base plate or with a fundament by means of the connecting bolt; and a centering sleeve connected with said base plate, wherein an axis (b) of said centering sleeve coincides with the intersection line of two planes ($E_1$ $E_2$) that are perpendicular to the base surface and define the position of the wedges and/or the screw spindle, wherein said centering sleeve is received in the opening of said support plate such that said support plate is displaceably guided in the vertical direction by said centering sleeve, and wherein said centering sleeve is adapted to receive a connecting bolt connecting the object to the base plate or with the fundament.

7. A leveling shoe according to claim 6, wherein each of said adjusting wedge and said counter wedge has a stop face that is perpendicular to said base plate, and, when said supporting plate is at a maximum upward height adjustment, the stop faces come to rest on each other, and wherein the stop faces are positioned so as to face each other and are provided with semicylindrical recesses which, in the position of said adjusting wedge and said counterwedge corresponding to the maximum upward height adjustment of said supporting plate, together form an opening surrounding said centering sleeve.

8. A leveling shoe according to claim 6, wherein said support plate is provided with a concave recess on its upper side on which rests a disc which is dome-shaped on its underside, said disc having a bore hole through which said centering sleeve extends, and an upper area of said disc forms a support surface for the object or any necessary spacer discs.

9. A leveling shoe according to claim 3, further comprising a centering sleeve connected with the base plate, said centering sleeve having axis (b) that coincides with an intersection line of two planes ($E_1$ $E_2$) that are perpendicular to the base surface and define the position of the wedges and/or the screw spindle (6), wherein said centering sleeve is displaceably guided in a vertical direction in the opening of said support plate, and said centering sleeve is adapted to receive a connecting bolt connecting the object to the base plate or to the fundament, wherein said spacer sleeves contact said centering sleeve tangentially.

10. A leveling shoe comprising:

a base plate having a base surface;

a support plate for supporting an object, said support plate being adjustable in a height direction perpendicular to the base surface;

an adjusting wedge device for adjusting the height of said support plate, said adjusting wedge device including an adjusting wedge and a counterwedge, said adjusting wedge resting on said base plate and defining a supporting surface for supporting the support plate, said counterwedge resting on said base plate and defining a supporting surface for supporting the support plate;

a screw spindle for displacing said adjusting wedge and said counterwedge reciprocally towards and away from each other in a direction that is transverse to the elevation, said screw spindle comprising first and second threaded portions displaying the same thread pitch, but opposite thread direction, such that the supporting surfaces of said adjusting wedge and said counterwedge, in every position, are arranged symmetrically with respect to a first plane ($E_1$) that is perpendicular to the base surface, and in which the axis of the connecting bolt runs, and to which the screw spindle axis is positioned at a right angle, wherein said support plate includes an opening through which a connecting bolt can project essentially at a right angle relative to the base surface so that the object can be screwed with the base Plate or with a fundament by means of the connecting bolt; and a centering sleeve extending through said support plate, wherein each of said adjusting wedge and said counterwedge has a stop face that is perpendicular to said base plate, and, when said supporting plate is at a maximum upward height adjustment, the stop faces come together, and wherein the stop faces are directed towards each other and are provided with semicylindrical recesses which, in the position of said adjusting wedge and said counterwedge corresponding to the maximum upward height adjustment of said support plate, together form an opening surrounding said centering sleeve.

11. A leveling shoe according to claim 9, further comprising a disc positioned on said support plate, wherein said support plate is provided with a concave recess on its upper side, and said disc has an underside which is dome-shaped and is received in the concave recess of said support plate, and wherein said disc surrounds said centering sleeve, and an upper area of said disc forms a support surface for the object or any necessary spacer discs.

12. A leveling shoe according to claim 4, wherein, in a position of said adjusting wedge and said counterwedge that corresponds to a lowest position of said support plate, a front face of the plate rests against a stop face of said adjusting wedge facing away from said counterwedge.

13. A leveling shoe according to claim 7, wherein said support plate is provided with a concave recess on its upper side on which rests a disc which is dome-shaped on its underside, said disc having a bore hole through which said centering sleeve extends, and an upper area of said disc forms a support surface for the object or any necessary spacer discs.

* * * * *